US00RE45708E

(19) United States
(12) Reissued Patent
Frantz et al.

(10) Patent Number: US RE45,708 E
(45) Date of Reissued Patent: Sep. 29, 2015

(54) VLAN FRAME FORMAT

(71) Applicant: Rockstar Consortium LP US, Ricardson, TX (US)

(72) Inventors: Paul James Frantz, San Francisco, CA (US); Geoffrey O. Thompson, Mountain View, CA (US)

(73) Assignee: Spherix Incorporated, Tysons Corner, VA (US)

(21) Appl. No.: 13/728,838

(22) Filed: Dec. 27, 2012

Related U.S. Patent Documents

Reissue of:

(64) Patent No.: 6,111,876
Issued: Aug. 29, 2000
Appl. No.: 08/705,631
Filed: Aug. 30, 1996

U.S. Applications:

(60) Continuation of application No. 12/459,465, filed on Jun. 30, 2009, now Pat. No. Re. 44,775, which is a (Continued)

(51) Int. Cl.
*H04W 4/00* (2009.01)
*H04L 12/28* (2006.01)

(Continued)

(52) U.S. Cl.
CPC ..... *H04W 76/021* (2013.01); *H04W 72/1242* (2013.01); *H04W 84/18* (2013.01)

(58) Field of Classification Search
CPC ..... H04W 72/1242; H04W 76/021; H04W 84/18; H04L 12/00; H04L 12/4633; H04L 12/4641; H04L 12/467; H04J 3/16
USPC ..... 370/338–474; 455/450, 452.1
See application file for complete search history.

(56) References Cited

U.S. PATENT DOCUMENTS 5,220,564 A 6/1993 Tuch et al.
5,394,402 A 2/1995 Ross
(Continued)

OTHER PUBLICATIONS

Draft Recommended Practice 802.1H, "Media Access Control (MAC) Bridging of Ethernet V2.0 in 802 Local Area Networks," pp. 1-22, Jul. 7, 1994.

(Continued)

*Primary Examiner* — Afsar M Qureshi
(74) *Attorney, Agent, or Firm* — Mintz Levin Cohn Ferris Glovsky and Popeo, P.C.

(57) ABSTRACT

In a network device such as a network switch having a port coupled to a communications medium dedicated to a single virtual local area network and another port coupled to a communications medium shared among multiple virtual local area networks for transmitting data frames between the dedicated communications medium and the shared communications medium, a method of identifying the virtual network associated with each data frame received by the network switch when transmitting the data frames over the shared communications medium. The method comprises receiving data frames from the dedicated communications medium coupled to one port, and, with respect to each data frame so received, inserting a new type field and a virtual network identifier field. The contents of the new type field indicate the data frame comprises a virtual network identifier field. The method further includes placing a value in the virtual network identifier field identifying the virtual network associated with the data frame and transmitting the data frame over the shared communications medium. Upon receipt of the data frames from over the shared communications medium, another network device can discern from the virtual network identifier field in each data frame the virtual network from which the data frames were received and determine whether to forward the data frames accordingly.

12 Claims, 7 Drawing Sheets

Related U.S. Application Data division of application No. 10/225,708, filed on Aug. 22, 2002, now Pat. No. Re. 40,999, which is an application for the reissue of Pat. No. 6,111,876, which is a continuation-in-part of application No. 08/613,726, filed on Mar. 12, 1996, now Pat. No. 5,959,990.

(51) Int. Cl.

| | |
|---|---|
| ***H04W 76/02*** | (2009.01) |
| ***H04W 72/12*** | (2009.01) |
| *H04W 84/18* | (2009.01) |

(56) References Cited

U.S. PATENT DOCUMENTS

| | | | | |
|---|---|---|---|---|
| 5,560,038 | A | 9/1996 | Haddock | |
| 5,583,862 | A | 12/1996 | Callon | |
| 5,617,421 | A | 4/1997 | Chin et al. | |
| 5,684,800 | A | 11/1997 | Dobbins et al. | 370/401 |
| 5,740,171 | A | 4/1998 | Mazzola et al. | 370/392 |
| 5,742,604 | A | 4/1998 | Edsall et al. | 370/401 |
| 5,764,636 | A | 6/1998 | Edsall | 370/401 |
| 5,946,308 | A | 8/1999 | Dobbins et al. | 370/392 |
| 5,959,990 | A * | 9/1999 | Frantz et al. | 370/392 |
| 6,111,876 | A * | 8/2000 | Frantz et al. | 370/392 |
| RE40,999 | E * | 11/2009 | Frantz et al. | 370/395.3 |
| 8,023,515 | B2 * | 9/2011 | Dobbins et al. | 370/395.53 |
| RE44,775 | E * | 2/2014 | Frantz et al. | 370/392 |
| RE45,065 | E * | 8/2014 | Frantz et al. | 370/392 |
| RE45,081 | E * | 8/2014 | Frantz et al. | 370/392 |
| RE45,121 | E * | 9/2014 | Frantz et al. | 370/392 |
| 2009/0245227 | A1 * | 10/2009 | Chin et al. | 370/350 |
| 2011/0134858 | A1 * | 6/2011 | Seo et al. | 370/329 |

OTHER PUBLICATIONS

Local and Metropolitan Area Networks 802.10 Supplements, "IEEE Standards—Secure Data Exchange (SDE) Sublayer Management (Subclause 2.8) and Recommended Practice for SDE on Ethernet V2.0 in IEEE 802 LANs (Annex 2H)," May 19, 1994.

Local and Metropolitan Area Networks 802.10 Supplements, "Interoperable LAN/MAN Security (SILS)—Currently Contains Secure Data Exchange (SDE) (Clause 2)," Feb. 5, 1993.

* cited by examiner

VLAN FRAME FORMAT

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This application is a continuation-in-part of United States patent application entitled, "VLAN FRAME FORMAT", Ser. No. 08/613,726, filed on Mar. 12, 1996, now U.S. Pat. No. 5,959,990.

*NOTICE: More than one reissue application has been filed for the reissue of U.S. Pat. No. 6,111,876. The reissue applications are U.S. application Ser. No. 10/225,708, now Reissue U.S. Pat. No. Re. 40,999, issued on Nov. 24, 2009, and U.S. application Ser. No. 12/459,465, now Reissue U.S. Pat. No. Re. 44,775, issued on Feb. 25, 2014, which is a divisional reissue of U.S. application Ser. No. 10/225,708, now Reissue U.S. Pat. No. Re. 40,999. The present U.S. application Ser. No. 13/728,838, filed on Dec. 27, 2012, which has been filed during the pendency of U.S. application Ser. No. 12/459,465, now Reissue U.S. Pat. No. Re. 44,775, is a continuation reissue of U.S. application Ser. No. 12/459,465, now Reissue U.S. Pat. No. Re. 44,775, which is a divisional reissue of U.S. Pat. No. 6,111,876.*

*Other reissue applications include: U.S. application Ser. No. 13/728,770, filed Dec. 27, 2012, which is a continuation reissue of U.S. application Ser. No. 12/459,465, now Reissue U.S. Pat. No. Re. 44,775; U.S. application Ser. No. 13/728,787, filed Dec. 27, 2012, now Reissue U.S. Pat. No. Re. 45,065, issued on Aug. 5, 2014, which is a continuation reissue of U.S. application Ser. No. 12/459,465, now Reissue U.S. Pat. No. Re. 44,775; U.S. application Ser. No. 13/728,823, filed Dec. 27, 2012, now Reissue U.S. Pat. No. Re. 45,081, issued on Aug. 19, 2014, which is a continuation reissue of U.S. application Ser. No. 12/459,465, now Reissue U.S. Pat. No. Re. 44,775; U.S. application Ser. No. 13/728,846, filed Dec. 27, 2012, now Reissue U.S. Pat. No. Re. 45,095, issued on Aug. 26, 2014, which is a continuation reissue of U.S. application Ser. No. 12/459,465, now Reissue U.S. Pat. No. Re. 44,775; U.S. application Ser. No. 13/728,867, filed Dec. 27, 2012, which is a continuation reissue of U.S. application Ser. No. 12/459,465, now Reissue U.S. Pat. No. Re. 44,775; U.S. application Ser. No. 13/728,698, filed Dec. 27, 2012, which is a divisional reissue of U.S. application Ser. No. 12/459,465, now Reissue U.S. Pat. No. Re. 44,775; U.S. application Ser. No. 13/728,747, filed Dec. 27, 2012, which is a divisional reissue of U.S. application Ser. No. 12/459,465, now Reissue U.S. Pat. No. Re. 44,775.*

COPYRIGHT NOTICE

Contained herein is material which is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION

1. Field of the Invention

The present invention relates to the field of data communications. More specifically, the present invention relates to a method and frame format for preserving in a data frame the virtual local area network (VLAN) associated with the data frame as determined by a network device from which the data frame was received when transmitting the data frame over a communications medium shared among multiple VLANs. The method and frame format are equally applicable when the network device uses criteria in addition to or instead of the ingress port to associate a VLAN with the data frame.

2. Description of the Related Art

A small baseband local area network (LAN) typically connects a number of nodes, e.g., a server and workstations, to a shared communications medium wherein all nodes compete for available bandwidth on the shared communications medium. In an Ethernet or Institute of Electrical and Electronics Engineers (IEEE) 802.3 standard local area network, when a node transmits a unicast data frame on the network, every node coupled to the shared medium receives and processes the data frame to determine if it is the node to which the data frame is destined. Moreover, when a station transmits a broadcast data frame on the network, all nodes see the data frame and must process it to determine whether they should respond to the broadcasting node. As the number of nodes coupled to the medium increase, data traffic can become congested, resulting in an undesirable level of collisions and network related delays in transmitting data frames, which in turn results in network and node performance degradation.

A common prior art method of reducing congestion is to separate a LAN into multiple LAN segments by way of a network device, such as a bridge or network switch, operating at the Media Access Control (MAC) sublayer of the Data Link layer (layer 2) of the International Standards Organization (ISO) Open Systems Interconnection (OSI) reference model. While all nodes in the data network may still belong to the same broadcast domain, that is, each node still transmits and receives broadcast data frames to/from all nodes on all LAN segments in the network, nodes sharing the same LAN segment see only unicast data frames generated by or destined to a node on the same LAN segment. Given that the bulk of data traffic on a LAN is unicast in nature, segmentation may somewhat reduce collisions and traffic related performance problems.

However, as the number of LAN segments and nodes per segment increases in the same broadcast domain, the nodes can become overburdened processing broadcast data frames. It may be desirable under such circumstances to separate the growing data network into multiple broadcast domains. One possible approach to creating multiple broadcast domains is to separate one or more LAN segments using a network device such as a router, operating at the Network layer (layer 3) of the OSI reference model. With reference to FIG. 1, a data network 10 is illustrated wherein a number of internet-working devices are installed to reduce traffic levels on each LAN segment. A router 100 separates LAN segments 103, 110 and 120 into one broadcast domain 11, and LAN segments 105, 130 and 140 into another broadcast domain 12.

For example, router 100 only forwards a unicast data frame from a node on LAN segments 103, 110 or 120 that is specifically addressed (at layer 3 of the OSI model) to a node on LAN segments 105, 130 or 140, and vise versa. Network devices 101 and 102 may be, for example, network switches. Network switch 101 separates LAN segments 103, 110 and 120 to reduce unicast traffic on each segment while the segments still remain in the same broadcast domain 11. Network switch 102 functions in a similar manner with respect to LAN segments 105, 130 and 140.

LAN segments 110, 120, 130 and 140 may have multiple nodes attached. For example, LAN segment 110 has nodes 111 and 112 coupled to it, and functions, therefore, as a shared communications medium, wherein the nodes share the available bandwidth (e.g., 10 million bits per second in a traditional Ethernet carrier sense, multiple access data bus with collision detection [CSMA/CD]). LAN segments 103 and 105, on the other hand, are dedicated LAN segments, therefore, nodes 104 and 106 have all available bandwidth to themselves. For example, nodes 104 and 106 may be servers requiring greater bandwidth. Dedicated LAN segments 103 and 105 may be any technology supporting delivery of Ethernet or IEEE 802 LLC data frames including CSMA/CD or Fiber Distributed Data Interface (FDDI) segments operating at 100 million bits per second, or Asynchronous Transfer Mode LAN emulation service running over segments operating at 155 million bits per second.

The router 100 has the further advantage of allowing for the implementation of policy restrictions among network administrator-defined groups in the network. For example, it may be desirable to prohibit nodes in broadcast domain 12 from communicating with nodes in broadcast domain 11 using any protocol except those specifically allowed by the network administrator.

However, as can be seen in FIG. 1, data network 10 involves significant hardware and software expenses associated with two network switches, a router, and the multiple communication lines required to achieve multiple broadcast domains. Moreover, a significant amount of administrative overhead is required to maintain the configuration and operation of the internetworking devices as required, for example, when a node is moved from one segment to another segment in the same or different broadcast domain. Thus, it is desirable to implement the data network 10 of FIG. 1 using a single network switch and virtual local area networks (VLANs).

FIG. 2A illustrates data network 10 using a single network switch 200 and virtual local area networks (VLANs) to create multiple broadcast domains 11 and 12. A VLAN is a logical local area network comprised of a plurality of physical local area networks as determined by some network administrator-defined criteria, e.g., grouping local area networks based on geographical topology of the data network, or business units/functions of a company, such as finance or engineering departments. Such VLANs are generally configured based on the points where the physical LANs enter a switched network. For example, network switch 200 is configured such that ports 201 through 203 and 207 belong to VLAN 210, and ports 204-206 belong to VLAN 220. LAN segments 103, 110 and 120 coupled to ports 201-203, respectively, belong to VLAN 210. LAN segments 130, 140 and 105 coupled to ports 204, 207, and 205, respectively, belong to VLAN 220. The configuration of data network 10 in FIG. 2A is relatively less expensive than the configuration of data network 10 in FIG. 1 in that only one switch is required. Moreover, since VLANs are configured at network switch 200, a network administrator can maintain configuration and operation of the network without concern for moving a node from one LAN segment to another LAN segment in the same VLAN.

When the system grows beyond the capacity of a single switch or when geographical constraints create a need for switching capacity at more than one site, additional switches are added to the network. FIG. 2B shows the addition of switch 300 to the network shown in FIG. 2A. LAN segment 190 is used to link switch 300 to switch 200. Switch 300 supports segments 150 and 160 in VLAN 210 and segments 170 and 180 in VLAN 220.

In the prior art, when switch 200 receives a broadcast packet from VLAN 210, station 104, it forwards the packet out all of its other VLAN 210 ports (202, 203 and 207) and also forwards it from port 208 to switch 300. Switch 300 examines the MAC source address (i.e., the ISO layer 2 source address) and based on a prior exchange of information with switch 200 is able to determine the proper VLAN to use for frames from that source address, in this case, VLAN 210. Based on this determination, switch 300 forwards the frame to all of its VLAN 210 ports (e.g., ports 302 and 303).

The success of this approach depends on prohibiting frames having the same MAC source address from appearing on multiple VLANs. However, the prohibition makes this approach unusable in some networks. To work around this problem, some prior art implementations use additional fields within the packet, such as the ISO layer 3 source address, to resolve ambiguities. However, even this approach does not work in all cases, as there are many types of frames which do not contain sufficient information to make a reliable VLAN determination. Examples of such frames include Internet Protocol (IP) BOOTP requests, IPX Get Nearest Server requests and frames from non-routable protocols.

All messages (in the form of a data frame) transferred between nodes of the same VLAN are transmitted at the MAC sublayer of the Data Link layer of the OSI reference model, based on each node's MAC layer address. However, there is no connectivity between nodes of different VLANs within network switch 200 or 300.

For example, with reference to FIG. 2A, even though all physical LAN segments 103, 105, 120, 130, and 140 are connected to ports on network switch 200, the VLAN configuration of switch 200 is such that nodes in one VLAN cannot communicate with nodes in the other VLAN via network switch 200. For example, node 104 can communicate with node 122 but cannot communicate with node 142 by way of switch 200. Rather, router 100 connects VLAN 210 to VLAN 220 via communications mediums 101 and 102 respectively, so that node 104 can communicate with node 142. Messages transferred between nodes of different VLANs are most often transmitted at the Network layer of the OSI reference model, based on the Network layer address of each node, e.g., an Internet Protocol (IP) address, Router 100 also allows a network administrator to configure appropriate policy restrictions and security rules to reduce unnecessary or unwanted traffic in data network 10.

Using a routing function to transfer data frames between VLAN 210 and VLAN 220 as illustrated in FIG. 2B is inappropriate, however, for data frames of protocol suites that do not support a network layer protocol, e.g., DEC LAT or NetBIOS. To deal with this problem, routers commonly provide a capability for bridging frames of non-routable protocols. For example, assume node 106 in VLAN 220 uses the DEC LAT protocol in an attempt to transmit a data frame to a node in VLAN 210. Switch 200 receives the data frame from node 106 over dedicated communications medium 105 and transfers it to router 100 via communications medium 102. Router 100, not being able to route DEC LAT traffic, may bridge the data frame back to switch 200 via communications medium 101. Switch 200 receives the data frame and, because the data frame is bridged instead of routed, the source MAC address is unchanged. Switch 200 has now received on both ports 205 (in VLAN 220) and 207 (in VLAN 210) a data frame having the MAC address for node 106, and cannot, therefore, unambiguously determine over which port node 106 is connected, or which VLAN should be associated with node 106. Therefore, switch 200 is unable to inform switch 300 of which VLAN should be associated with the MAC address of node 106.

Another circumstance which creates difficulties in establishing a MAC address to VLAN mapping is when a routing protocol, e.g., the DecNet routing protocol, transmits data frames using the same source MAC address on both communications mediums 101 and 102.

Yet another drawback of the configuration of data network 10 as illustrated in FIG. 2A is that a communications link is needed between network switch 200 and router 100 for each virtual local area network (VLAN). As the number of physical LAN segments and VLAN segments increase, and as the distance between LANs increase necessitating utilization of metropolitan- and wide-area communications mediums/facilities, the monetary and administrative expense required to maintain data network 10 also increases. As illustrated in FIG. 3, one means of reducing this expense is to combine multiple communications links into a single shared communications medium 300 between switch 200 and router 100. The same problems which prevented switch 300 in FIG. 2B from reliably determining the proper VLAN for frames received over segment 190 also prevent switch 200 in FIG. 3 from reliably associating VLANs with data frames received over segment 300. Thus, a means is needed to identify the virtual local area network (VLAN) from which a frame originated when transferring the frame over a communications medium shared among multiple VLANs.

One such prior art method identifying the VLAN associated with a MAC address of a node involves creating and maintaining a lookup table on each network device in the data network. The lookup table contains entries associating the MAC address of a node with the port on the network device over which the node is reachable. The node may be coupled to a shared or dedicated communications medium which is further coupled to the port. Each entry also contains a VLAN identifier identifying the virtual local area network (VLAN) assigned to the port. If multiple network devices exist in the data network, as illustrated in FIG. 3, they may utilize a protocol to exchange lookup tables so that each device knows which VLAN is assigned to each port on each device and what nodes (identified by their respective MAC addresses) are reachable via each port as well as which nodes belong to the same VLAN and are allowed, therefore, to communicate with each other.

A prior art method of reliably identifying the VLAN from which a data frame originated utilizes a management defined field (MDF) of an IEEE standard 802.10 Secure Data Exchange (SDE) Protocol Data Unit (PDU). The MDF allows the transfer of proprietary information that may facilitate the processing of a data frame. The prior art method uses the MDF to store a VLAN identifier as the data frame is transferred from a network device over a communications medium shared among multiple VLANs so that when another network device receives a data frame from the shared communications medium, it can determine the VLAN associated with the data frame and determine whether to forward the frame accordingly, depending on the VLANs configured for each port on the network device.

FIG. 4 illustrates the frame format for an IEEE 802.3 MAC/802.10 SDE data frame utilizing the MDF to identify the VLAN associated with the data frame. Portion 401 of data frame 400 is the IEEE 802.3 media access control (MAC) header, comprising a 6 byte destination MAC address field, and 6 byte source MAC address field, and a 2 byte length field. Portion 402 indicates the IEEE 802.10 secure data exchange (SDE) clear header, comprising the SDE designator field 404 containing a special destination service access point (DSAP), source service access point (SSAP), and control field for SDE frames, a security association identifier (SAID) field 405, and the management defined field (MDF) 406. The remainder of the original data frame, comprising its IEEE 802.2 LLC header followed by the user data, is included in field 403.

A VLAN identifier representing the VLAN associated with the data frame received by the network device is placed in the MDF 406 by the MAC layer and other relevant hardware and software in the network device. When the frame is subsequently transmitted across a shared communications medium, such as when switch 300 of FIG. 2B forwards over shared communications medium 190 a data frame destined for a node coupled to a port associated with a different VLAN on switch 200, switch 200 is able to determine the VLAN from which the data frame was received by switch 300 and forward it accordingly to router 100 (if, indeed, inter-VLAN communication is required). Router 100 then routes the data frame back to switch 200, where switch 200 then determines whether to forward the frame to the appropriate port based on the VLAN identifier in the MDF and destination MAC address in the destination MAC address field.

However, the frame format illustrated in FIG. 4 supports only the IEEE 802.3 media access control standards. An Ethernet-based data frame is considered nonstandard by the IEEE, and, therefore, cannot utilize the IEEE 802.10 header, or any other IEEE based header to preserve the VLAN, except through the use of an additional layer of encapsulation. IEEE Recommended Practice 802.1H is one way of performing this additional encapsulation. This extra layer of encapsulation reduces the efficiency of bandwidth utilization and adds complexity to the implementation. Thus, a method and frame format for identifying the VLAN associated with a data frame received at a network switch from either an Ethernet LAN or an IEEE 802.3 LAN is needed to support the existing infrastructure of Ethernet networks in a data network transmitting data frames from multiple VLANs across a shared communications medium. This will allow compatibility with Ethernet-based nodes on the same shared media with nodes supporting VLAN identification.

SUMMARY OF THE DISCLOSURE

The present invention relates to a method and frame format for preserving in a data frame as the data frame is transmitted across a communications medium shared among a plurality of virtual local area networks (VLANs), the VLAN which was associated with the data frame at the point where it entered the network. The method supports existing data network infrastructures, including Ethernet based data network infrastructures.

According to one aspect of the invention, a data frame format extends the traditional Ethernet frame format to accommodate a VLAN header. In one embodiment, a unique Ethernet type field value is used to identify the data frame as having a VLAN header inserted between the Ethernet type field and the user data field. In another embodiment, the unique Ethernet type field value is used to identify the data frame as having a VLAN header inserted prior to the Ethernet type field of the original Ethernet frame.

The original Ethernet type field or the length field of an IEEE 802.3 data frame is preserved when the data frame is transferred from a shared communications medium to a dedicated communications medium, as when happens when a network switch receives the data frame over shared communications medium coupling the network switch to another network switch, and transmits the data frame over a dedicated communications medium coupling the network switch to a node.

The VLAN header comprises a VLAN identifier field that identifies the VLAN associated with the frame at the point at which the data frame was received by a network switch. In one embodiment, the VLAN header is further comprised of a VLAN identifier type and/or a VLAN identifier length field, both of which precede the VLAN identifier field and respectively specify a format and length of the subsequent VLAN identifier field.

Thus it is an object of the present invention to provide a method and frame format for identifying the VLAN associated with a data frame received at a network switch from an Ethernet or IEEE 802.3 LAN. This is needed to support the existing infrastructure of Ethernet networks in a data network transmitting data frames from multiple VLANs across a shared communications medium. This will allow compatibility with both IEEE 802.3-based and traditional Ethernet-based nodes on the same shared media with nodes supporting VLAN identification as well.

It is another object of the present invention to provide a data frame format that allows for inclusion of a VLAN identifier field that does not extend the MAC frame so far as to require fragmentation to avoid ambiguity between Ethernet and IEEE 802.3 frame types.

BRIEF DESCRIPTION OF THE DRAWINGS

The present invention is illustrated by way of example and not limitation in the following figures. Like references indicate similar elements, in which.

DETAILED DESCRIPTION OF THE EMBODIMENTS OF THE INVENTION

Described herein is a method and frame format for preserving in a data frame the virtual local area network (VLAN) associated with the data frame when transmitting the data frame over a communications medium shared among multiple VLANs. In the following description, numerous specific details are set forth in order to provide a thorough understanding of the present invention. It will be apparent, however, to one of ordinary skill in the art that the present invention may be practiced without these specific details. In other instances, well-known standards, frame format details, and techniques have not been shown in order not to unnecessarily obscure the present invention.

As network switching becomes more prevalent in data networks, and in particular, local area networks, it is desirable to segment data traffic into groups of virtual local area networks (VLANs), as discussed above. Generally, the MAC address of each node, as determined by the contents of the source MAC address field of a data frame transmitted by the node, is mapped to, or associated with, a VLAN assigned to the port of a network device (e.g., a network switch) at which the data frame enters the switched network. The method by which the network device forwards the data frame varies depending on whether the target node (as determined by the MAC address in the destination MAC address field of the data frame) resides on the same or different VLAN as the source node. It may be desirable to use a standard shared communications medium such as IEEE standard 10BASE-F or 100BASE-T for a backbone transmission fabric between network devices in a switched network. However, unless separate cables are use for each VLAN, the VLAN association of each data frame cannot be determined when the data frame is transmitted over the shared communications medium. A means for identifying, or preserving, the VLAN associated with each data frame when transmitting the data frames over a shared communications medium is needed.

The method described herein provides for a shared communications medium for transferring data frames from multiple virtual local area networks (VLANs) while preserving the VLAN associated with each frame, regardless of whether the data network supports the interconnection of Ethernet or IEEE standard 802.3 nodes.

Figure 1:
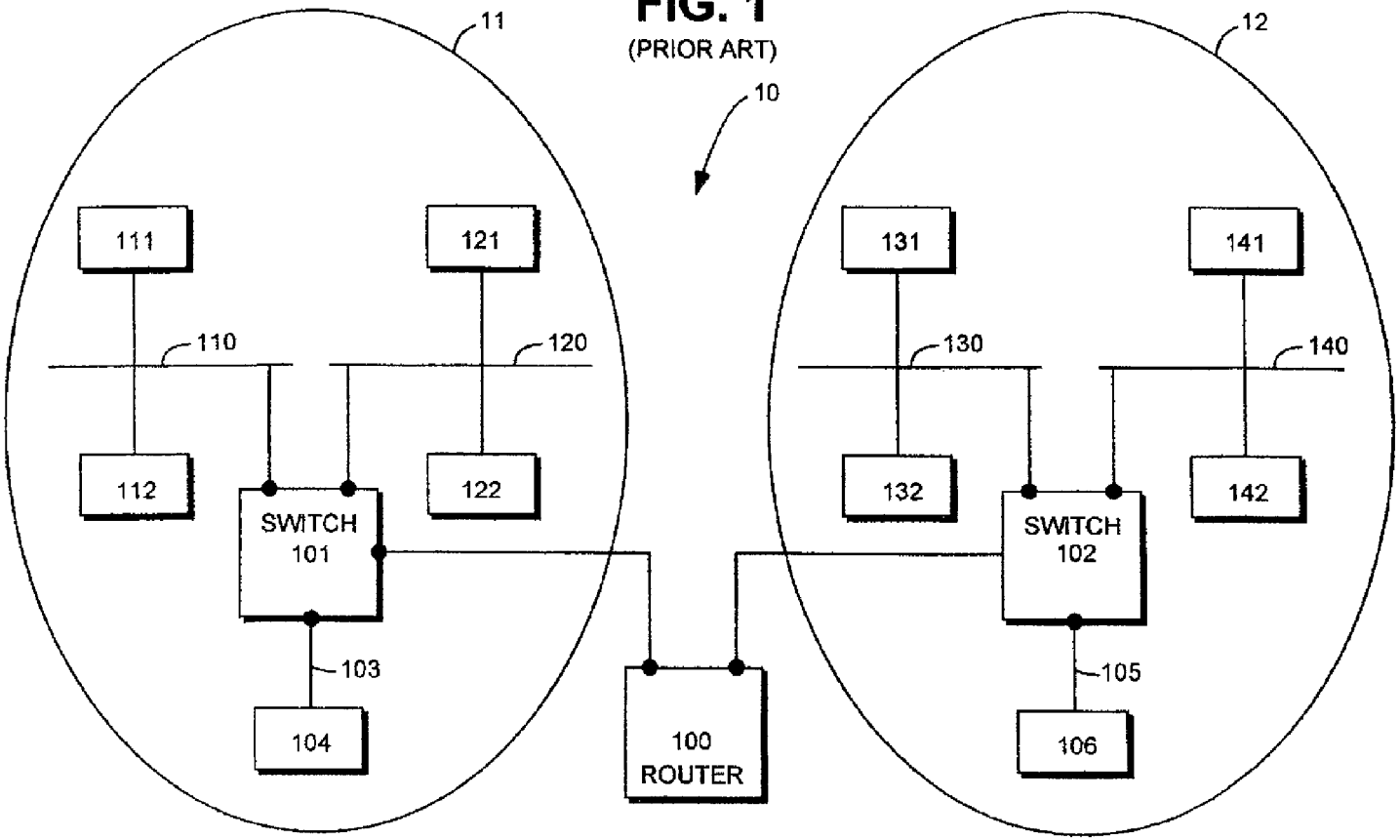
FIG. 1 (PRIOR ART)
FIG. 1 illustrates a prior art data network topology.
Figure 2A:
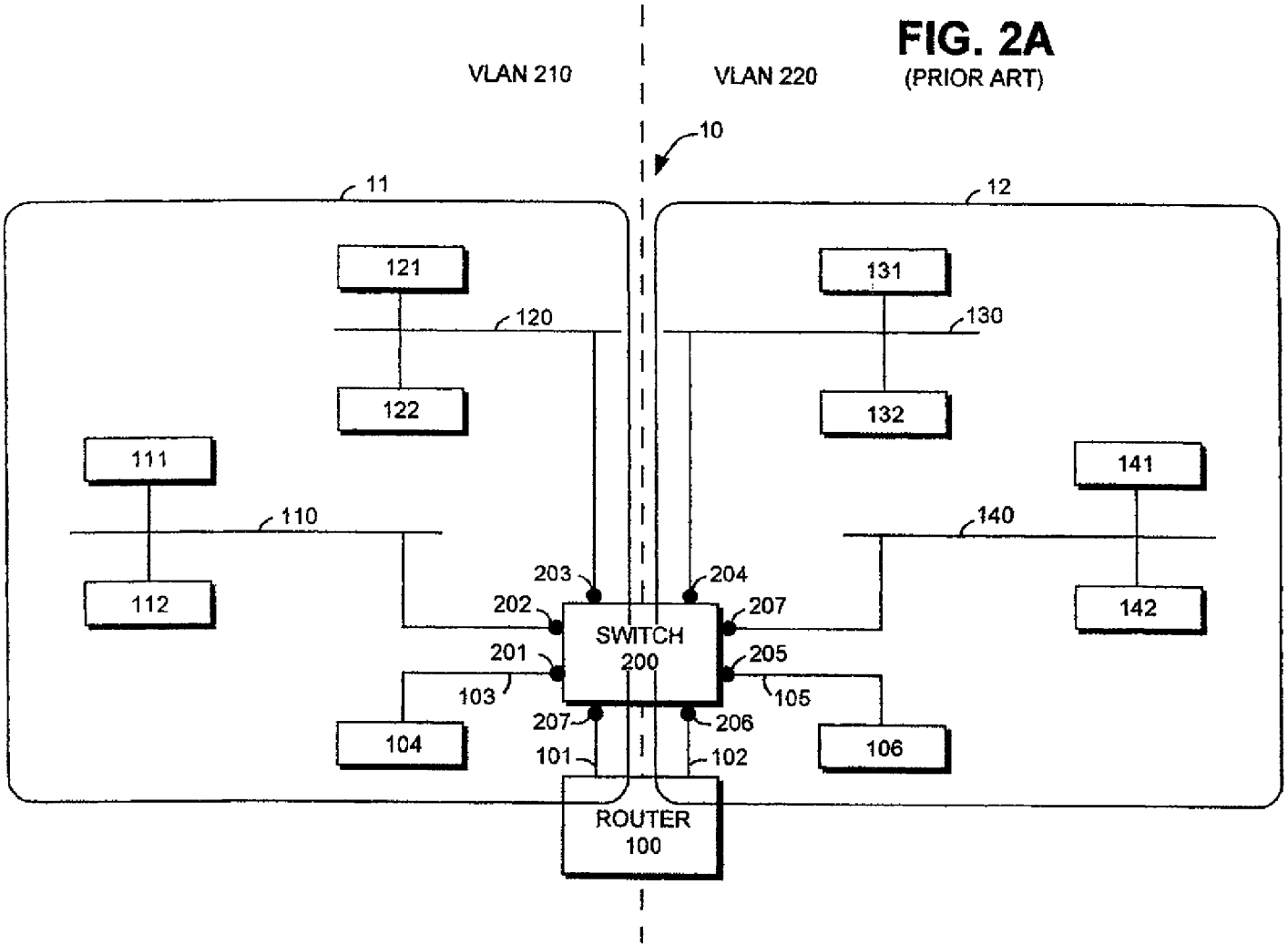
FIG. 2A (PRIOR ART)
FIG. 2A illustrates a prior art data network topology utilizing virtual local area networks.
Figure 2B:
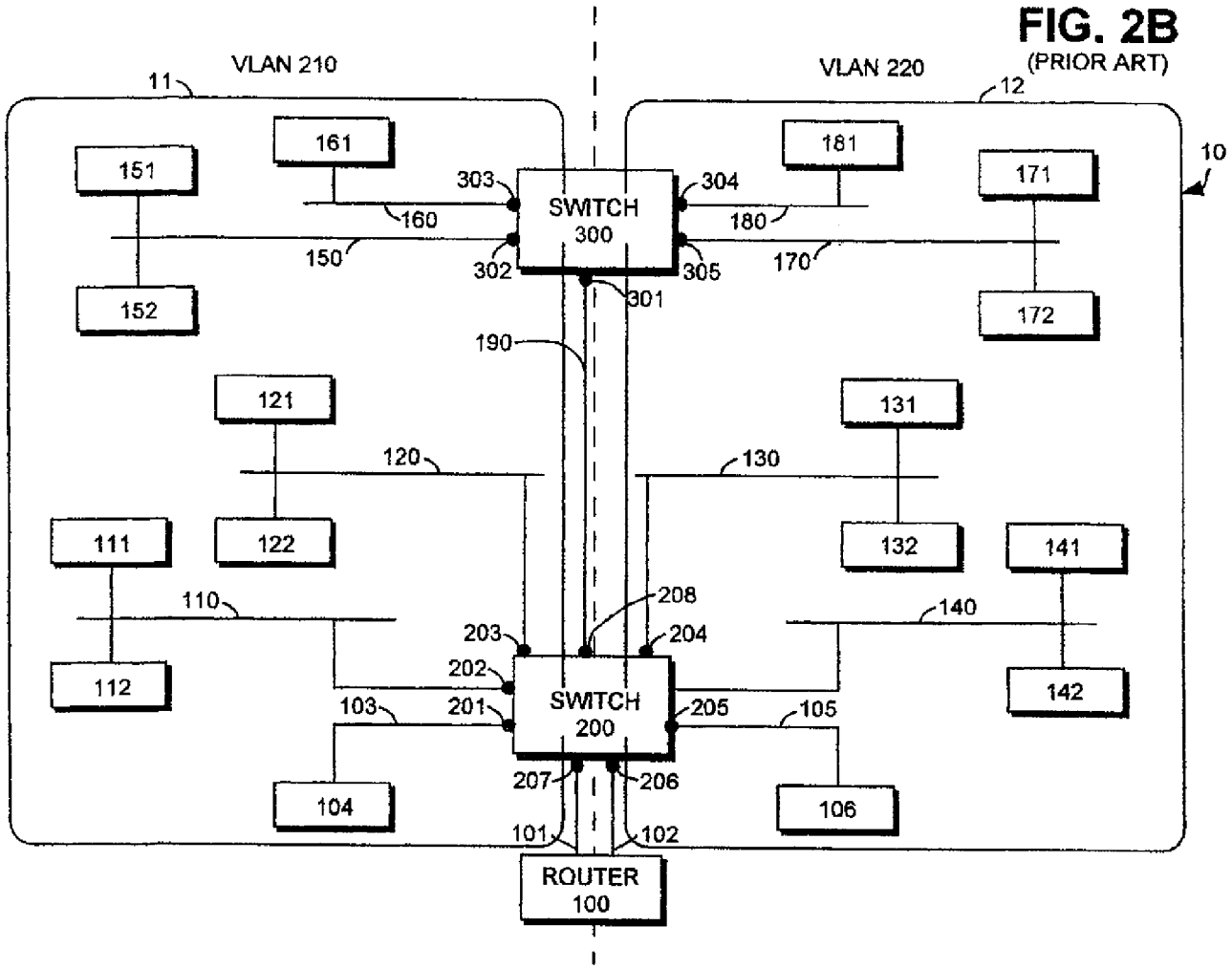
FIG. 2B (PRIOR ART)
FIG. 2B illustrates a prior art data network topology utilizing virtual local area networks and shared communications media between network devices.
Figure 3:
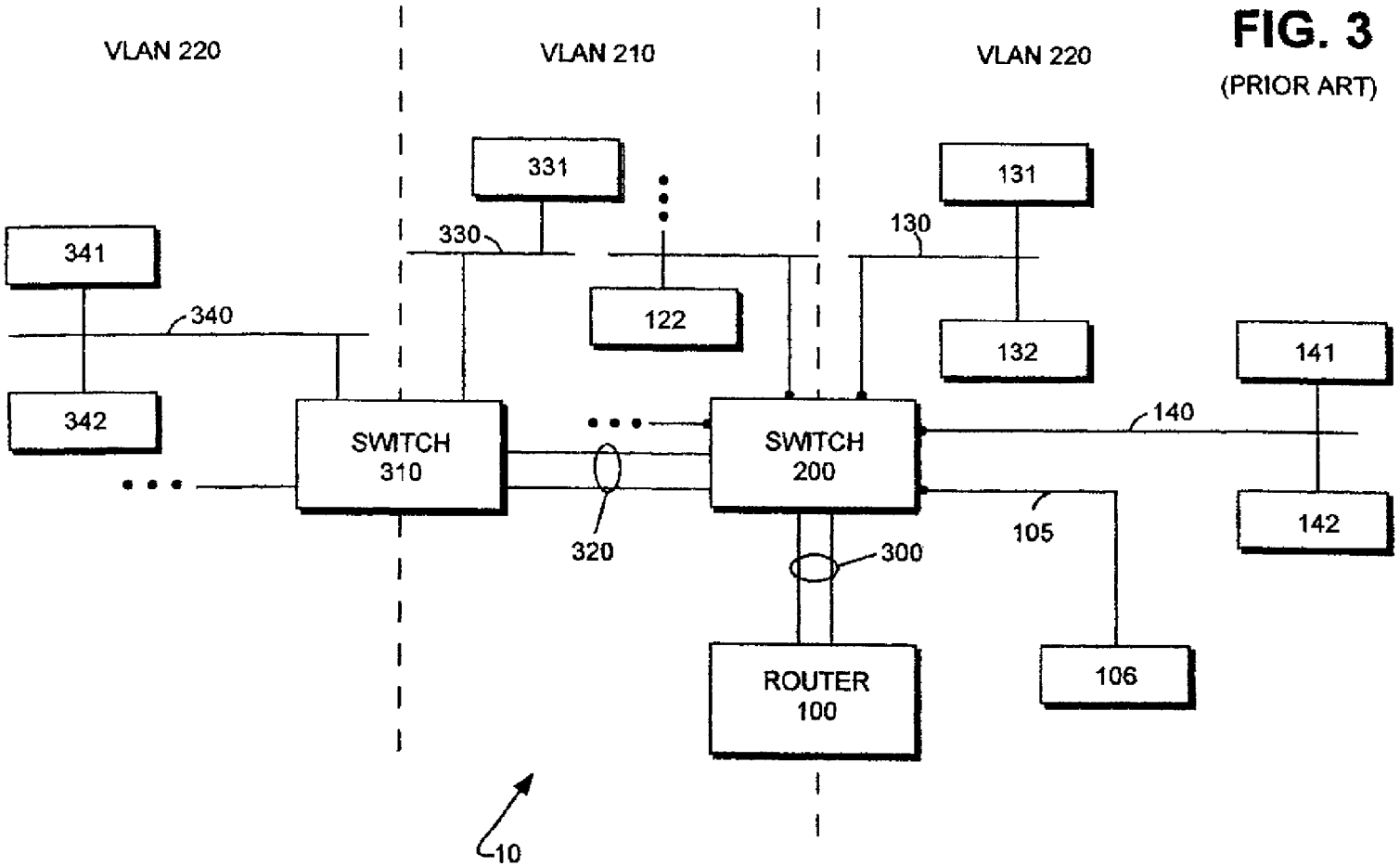
FIG. 3 (PRIOR ART)
FIG. 3 further illustrates a prior art data network topology utilizing virtual local area networks and shared communications media between network devices.
Figure 4:
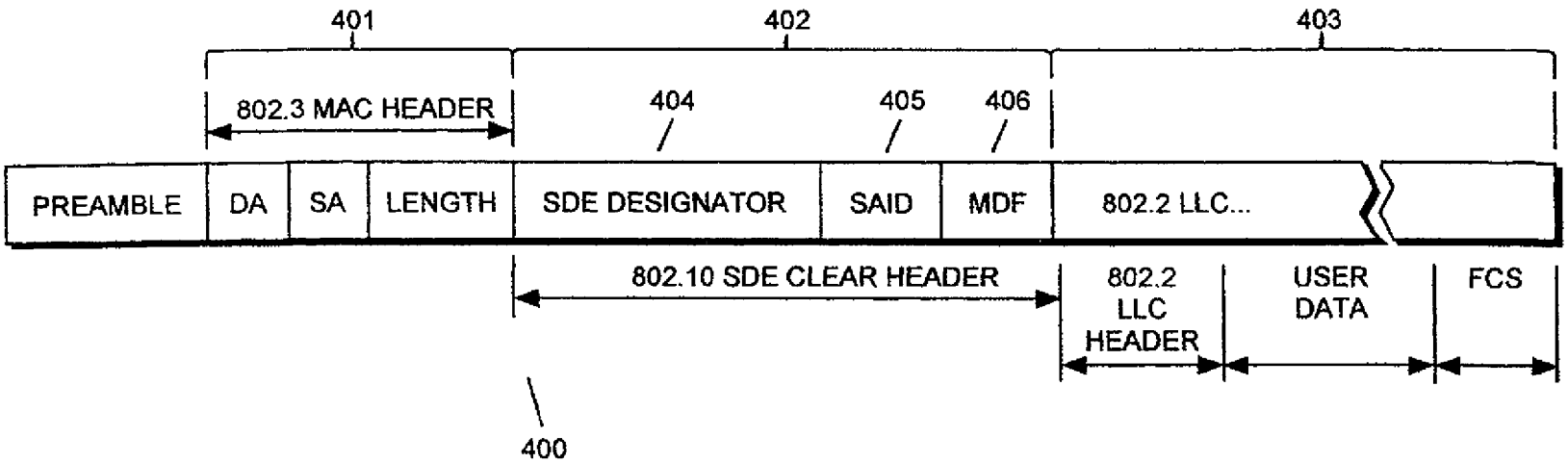
FIG. 4 (PRIOR ART)
FIG. 4 illustrates the IEEE 802.3 MAC/802.1 SDE frame format as may be utilized in the prior art.
Figure 5A:
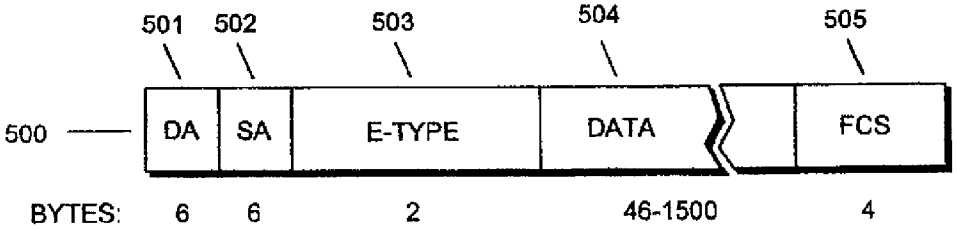
FIG. 5(a) illustrates an Ethernet frame format.

FIG. 5(a) illustrates the data frame format for an Ethernet network. Like the IEEE standard 802.3 frame format, the Ethernet frame format begins with a 6 byte destination MAC address field followed by a 6 byte source MAC address field. However, unlike the IEEE standard 802.3 frame format, a 2 byte Ethernet type (ETYPE) field 503 follows the source MAC address field. The ETYPE field indicates the protocol type of the next upper layer protocol header which begins immediately following the ETYPE field (e.g., 0800(h) indicates the IP network layer protocol). The data field 504 comprises any upper layer protocol information and user data, all of which is considered data from the perspective of the MAC sublayer. Finally, a frame check sequence (FCS) field 505, comprising a 32-bit cyclical redundancy check (CRC) of the contents of fields 501, 502, 503 and 504, completes the data frame.

An IEEE 802.3 frame format also begins with a 6 byte destination MAC address field followed by a 6 byte source MAC address field. As is well known to those of skill in the art, a 2 byte LENGTH field follows the source MAC address field. It should be noted that the present invention, although based on a modification of the Ethernet frame format described above, applies equally well when the original frame is an IEEE 802-standard format (e.g., IEEE 802.3). In such a case, the field following the MAC source address contains not the protocol type of an upper layer protocol, but a value indicating the length of the data field, as discussed above. The present invention preserves the value in that field in a new extended Ethernet frame format, but makes no other use of it, and is, therefore, not sensitive to whether the field contains protocol type or length information.

Figure 5B:
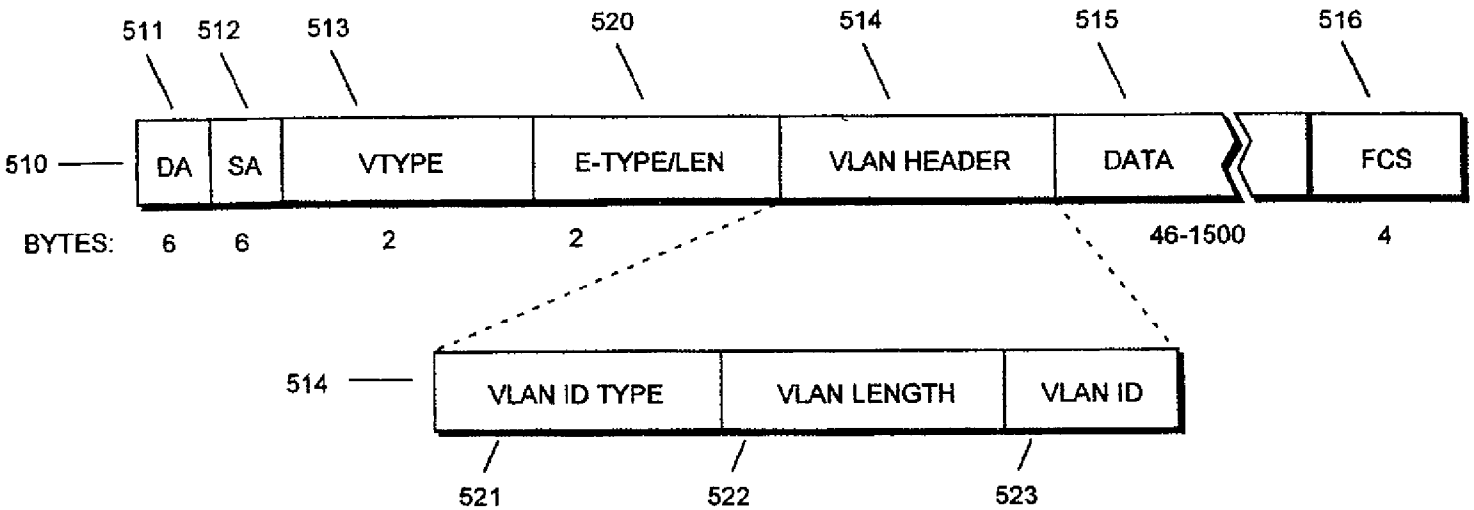
FIG. 5(b) illustrates a modified Ethernet frame format as may be utilized by the present invention.

FIG. 5(b) illustrates a data frame format that may be utilized by one embodiment of the present invention. The frame format extends the Ethernet frame format illustrated in FIG. 5(a) to accommodate a virtual local area network (VLAN) header 514, along with its associated VTYPE field 513. FIG. 5(b) illustrates a virtual type (VTYPE) field 513. VTYPE field 513 is inserted after the source MAC address field 512 and before the ETYPE field 520 of an Ethernet data frame or the length field of an IEEE 802.3 data frame. The virtual type (VTYPE) field 513 identifies the remainder of the frame as an extended Ethernet frame comprising a VLAN header 514 inserted, for example, after the Ethernet type field 520 and before the data field 515 shown in FIG. 5(b).

The contents of the ETYPE field 503 in FIG. 5(a), or the length field of an IEEE 802.3-based data frame is retained. Location 503 in FIG. 5(a) becomes location 520 in FIG. 5(b). The ETYPE field at location 520 returns back to location 503 in FIG. 5(a) when the data frame is transferred from a shared communications medium used to transmit data frames for multiple VLANs to a dedicated communications medium used to transmit data frames for a single VLAN.

A VLAN identifier type (VLAN ID TYPE) field and VLAN identifier length (VLAN LEN) field are present at locations 521 and 522, respectively. These two fields are used in combination to specify the format of the VLAN identifier (VLAN ID) field 523. Although this embodiment of the present invention utilizes only one type and length of VLAN ID field, is it foreseeable that multiple types of VLAN identifiers may be utilized, and that such identifiers may be of varying lengths, depending on the information conveyed by such identifiers, in which case, a network device receiving the data frame should check the VLAN ID TYPE and VLAN LEN fields and determine whether to accept or reject the data frame. In the event multiple VLAN ID TYPEs are utilized, it is envisioned that the VLAN ID TYPE values will be dispensed by an administrative authority.

The VLAN identifier length (VLAN LEN) field specifies the length of the VLAN identifier field in bytes. In this embodiment, the VLAN identifier field is 4 bytes in length. It is envisioned that the length of the VLAN identifier field will be a multiple of 4 bytes to maintain word alignment of fields in the data frame.

The VLAN identifier (VLAN ID) field 523 identifies the VLAN associated with the data frame. A network administrator or similar network wide authority is required to dispense values on a dynamic basis when configuring the virtual networks of the data network.

A new FCS 516 is calculated and replaces the prior FCS 505. FCS 516 performs a CRC on the destination and source MAC address fields, VTYPE field, ETYPE field, VLAN header, and data field.

While one embodiment has been described wherein the VLAN header 514 comprises the VLAN ID TYPE field, the VLAN identifier length (VLAN LEN) field, and the VLAN identifier (VLAN ID) field, alternative embodiments do not necessarily utilize such a VLAN header. For example, in one embodiment, the ETYPE field 503 in FIG. 5(a), or the length field of an IEEE 802.3-based data frame is contained in the VLAN header. In other words, the VLAN header 514 includes the location 520 wherein the value in the ETYPE field 503 in FIG. 5(a), or the length field of an IEEE 802.3-based data frame is preserved. In other embodiments, the VLAN header does not contain one or both of the VLAN ID TYPE field and the VLAN identifier length (VLAN LEN) field. Thus, the VLAN header can contain any number of fields in addition to the VLAN identifier (VLAN ID) field. It is appreciated that the format of the VLAN header can be differentiated by assignment of differing values to VTYPE field 513.

The extended Ethernet frame format illustrated in FIG. 5(b) may be utilized in the following manner. A network device (e.g., a network switch) has been configured so that a virtual local area network identifier representing a virtual local area network is assigned to each port on the network device. A data frame utilizing the Ethernet frame format (see FIG. 5(a)) or IEEE 802.3-based frame format may be transmitted by a node over a dedicated communications medium to the network switch. The network switch receives the data frame at a port coupled to the dedicated communications medium. At that time, or prior to transmitting the data frame over a shared communications medium to another network device, the network switch inserts a VTYPE field 513 between the source MAC address field 512 and the ETYPE field or length field 520 (depending on the frame format). The network switch then inserts a VLAN header between the ETYPE field or length field and data field of the data frame. The value originally in the ETYPE field 503 (or length field in the case of an IEEE 802.3-based frame format) of FIG. 5(a) is retained in ETYPE/Length field 520 as shown in FIG. 5(b). A value is placed in the VTYPE field 513 identifying the frame as containing VLAN identifier information (VTYPE 513). If utilized, a VLAN identifier type and VLAN identifier length field is inserted in VLAN header 514 at 521 and 522. Finally, the VLAN identifier associated with the data frame is placed in the VLAN identifier field 523. The data frame now having an extended Ethernet frame format is then transmitted over a shared communications medium.

Upon receiving the data frame, a network device processes the data frame. It determines the MAC address of a target node based on the contents of the destination MAC address field 511. Following the source MAC address field 512, the device then detects the presence of a VLAN header based on the contents of the VTYPE field, and determines the VLAN identifier associated with the data frame based on the contents of the VLAN identifier field. If a port on the network device which is eligible to receive the frame based on the destination MAC address is assigned the same VLAN identifier as the data frame, the network device then removes the VTYPE field and VLAN header from the data frame, calculates a new FCS for the data frame, and transmits the data frame out the port over a dedicated communications medium to the target node.

Figure 5C:
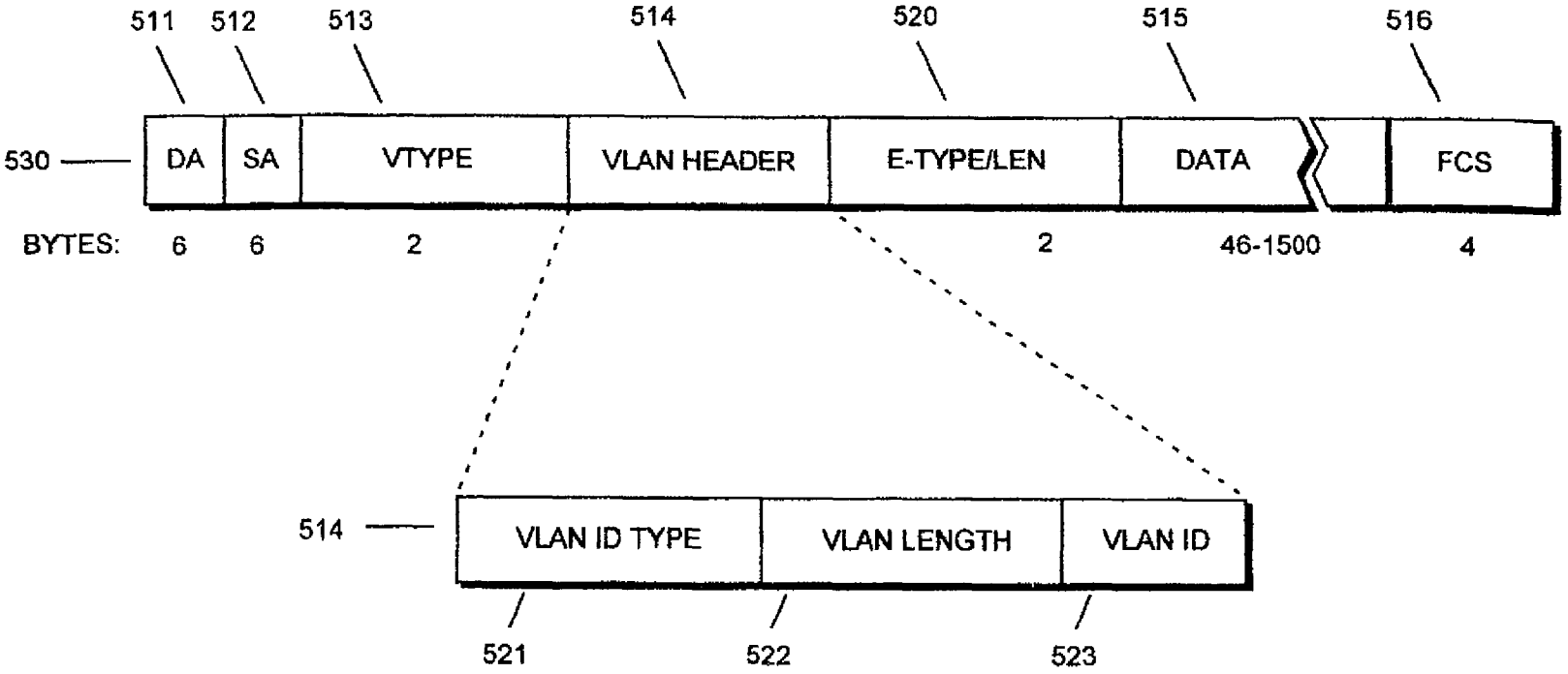
FIG. 5(c) illustrates a modified Ethernet frame format as may be utilized by the present invention.

FIG. 5(c) illustrates a data frame format that may be utilized by an alternative embodiment of the present invention. The frame format also extends the Ethernet frame format illustrated in FIG. 5(a) or an IEEE 802.3-based frame format, as did the frame format in FIG. 5(b), to accommodate a virtual local area network (VLAN) header 514. A virtual type (VTYPE) field 513 and VLAN header 514 is inserted between the source MAC address field 512 and ETYPE field 520 of an Ethernet data frame (or the length field of IEEE 802.3-based data frame) to respectively identify the frame as an extended Ethernet frame, and provide the VLAN identifier. Unlike the embodiment described in reference to FIG. 5(b) wherein the ETYPE/Length field 520 follows the VTYPE field 513 and precedes the VLAN header 514 in the data frame, the VLAN header 514 is inserted between the VTYPE field 513 and the ETYPE/Length field 520 such that the ETYPE field 520 follows the VTYPE field 513 and VLAN header 514.

The extended Ethernet frame format illustrated in FIG. 5(c) may be utilized in a similar manner as the previously described embodiments of the invention. For example, when a network switch receives the data frame at a port coupled to the dedicated communications medium, at that time, or prior to transmitting the data frame over a shared communications medium to another network device, the network switch inserts, at a location following the source address field 512, the VTYPE field 513. A value in the VTYPE 513 indicates the presence of a VLAN header. The network switch also inserts the VLAN header 514 following the VTYPE field 513. The data frame, now having an extended Ethernet frame format, can be transmitted over a shared communications medium.

Upon receiving the data frame, a network device processes the data frame. It determines the MAC address of a target node based on the contents of the destination MAC address field 511, and the MAC address of a source node based on the contents of the source MAC address field 512. The device then processes the VTYPE field 513. In processing the VTYPE field 513, the device detects the presence of the VLAN header 514, and determines the format of the VLAN identifier (VLAN ID) field 523 associated with the data frame from the VLAN identifier type (VLAN ID TYPE) field 521 and the VLAN identifier length (VLAN LEN) field 522. Subsequent to processing the VLAN header 514, the network device continues processing the data frame as is would process a non-VLAN frame.

While one embodiment has been described wherein a VLAN identifier type field is followed by a VLAN length field in the VLAN header, alternative embodiments of the invention do not necessarily use one or both of these fields, or may specify a VLAN length field followed by a VLAN identifier type field in a VLAN header. Thus, it is appreciated that the embodiment illustrated in FIG. 5(c) can be modified in any number of ways, as long as a VTYPE field is followed, in order, by a VLAN identifier field and an Ethernet type field (or length field for IEEE 802.3-based data frames).

There are, of course, other alternatives to the described embodiments of the invention which are within the understanding of one of ordinary skill in the relevant art. For example, the type of network switch which has a single VLAN identifier associated with each port and assumes that a data frame received on a port is destined for the VLAN associated with that port is just one type of network switch. Network switches may present more sophisticated methods of handling VLANs. In the general case, when a data frame is received from an end station on a network switch port, the switch will apply a set of rules to determine the VLAN to which that data frame should be forwarded. The rules can include such things as the port number at which a data frame is received, the data frame's ISO Layer 3 protocol type, the data frame's MAC or network layer source address, time of day, etc. More importantly, the first VLAN aware network switch to receive the data frame should apply its rules and assign the data frame to a VLAN. Thus, the present invention is intended to be limited only by the claims presented below.

Thus, what has been described is a method and frame format for preserving in a data frame the virtual local area network (VLAN) associated with a port on a network device from which the data frame was received when transmitting the data frame over a shared communications medium.

We claim:

[1. A method of identifying a virtual network associated with a data frame when transmitting said data frame between a communications medium and a shared communications medium, comprising the steps of:

a) receiving said data frame from said communications medium, said data frame comprising a first type field and a data field;

b) inserting a second type field at a location within said data frame preceding said first type field, said second type field indicating said data frame comprises a virtual network identifier field;

c) inserting said virtual network identifier field at a location between said second typo field and said first type field;

d) assigning a first value to said virtual network identifier field, said first value corresponding to said virtual network; and e) transmitting said data frame over said shared communications medium.]

[2. The method of claim 1, further comprising the steps of:

1) inserting between said second type field and said virtual network identifier field a virtual network identifier type field; and 2) assigning a second value to said virtual network identifier type field indicating a type of said first value in said virtual network identifier field.]

[3. The method of claim 1, further comprising the steps of:

1) inserting between said second type field and said virtual network identifier field a virtual network identifier length field; and 2) assigning a second value to said virtual network identifier length field indicating a length of said first value in said virtual network identifier field.]

[4. The method of claim 1 wherein said virtual network identifier field is 4 bytes.]

[5. The method of claim 1 wherein said virtual network identifier field is a multiple of 4 bytes.]

[6. The method of claim 1 wherein said first type field indicates a protocol type.]

[7. A method of identifying a virtual network associated with a data frame when transmitting said data frame between a communications medium and a shared communications medium, comprising the steps of:

a) receiving said data frame from said communications medium, said data frame comprising a length field and a data field;

b) inserting a type field at a location within said data frame preceding said length field, said type field indicating said data frame comprises a virtual network identifier field;

c) inserting said virtual network identifier field at a location between said type field and said length field;

d) assigning a first value to said virtual network identifier field, said first value corresponding to said virtual network; and e) transmitting said data frame over said shared communications medium.]

[8. The method of claim 7, further comprising the steps of:

1) inserting between said type field and said virtual network identifier field a virtual network identifier type field; and 2) assigning a second value to said virtual network identifier type field indicating a type of said first value in said virtual network identifier field.]

[9. The method of claim 7, further comprising the steps of:

1) inserting between said type field and said virtual network identifier field a virtual network identifier length field; and 2) assigning a second value to said virtual network identifier length field indicating a length of said first value in said virtual network identifier field.]

[10. The method of claim 8 wherein said virtual network identifier field is a multiple of 4 bytes.]

[11. In a network device, a method of transmitting a virtual network identifier in a data frame transmitted on a shared communications medium coupled to said network device, comprising:

a) transmitting a preamble field;

b) transmitting a destination and source media access control address field;

c) transmitting a first type field whose contents indicate said virtual network identifier is present in said data frame;

d) transmitting a virtual network identifier field containing said virtual network identifier;

e) transmitting a second type field whose contents indicate a protocol type associated with said data frame; and, f) transmitting a data field.]

[12. The method of claim 11 wherein said virtual network identifier field is 4 bytes.]

[13. In a network device having a first port coupled to a local area network (LAN) segment and a second port coupled to a shared communications medium, a method of associating a virtual network with a data frame received from said LAN segment and transmitted to said shared communications medium, comprising:

a) receiving said data frame at said first port, said data frame comprising a type field and a data field;

b) replacing a first value in said type field representing a protocol type with a second value indicating said data frame comprises a virtual network identifier field;

c) inserting said virtual network identifier field in said data frame between said type field containing said second value and said data field;

d) assigning a value representing said virtual network to said virtual network identifier field; and e) transmitting said data frame from said second port.]

[14. The method of claim 13 further comprising:

a) inserting a new type field between said virtual network identifier field and said data field; and b) assigning said first value representing said protocol type to said new type field to preserve said protocol type.]

[15. The method of claim 13 wherein said virtual network identifier field is 4 bytes.]

[16. The method of claim 13 wherein said virtual network identifier field is a multiple of 4 bytes.]

*17. A system for transmitting a data frame associated with a virtual network, the data frame being transmitted between a communications medium and a shared communications medium, the system comprising:*

*a first network device coupled to the shared communications medium and configured:*

*to receive the data frame from the communications medium, the data frame comprising a destination media access control (MAC) address, a source MAC address and a data field;*

*to insert a type field at a location within the data frame between the MAC addresses and the data field, a value of the type field indicating that the data frame comprises a virtual network identifier field;*

*to insert the virtual network identifier field at a location between the type field and the data field;*

*to assign a value to the virtual network identifier field, the value corresponding to the virtual network; and*

*to transmit the data frame over the shared communications medium and*

*a second network device comprising a port coupled to the shared communications medium and configured:*

*to receive the data frame by:*

*receiving the destination and source MAC addresses;*

*receiving the type field having the value indicating that the data frame comprises a virtual network identifier field; and*

*receiving the virtual network identifier field including reading the virtual network identifier field in accordance with the value of the type field to determine the value of the virtual network identifier field; and*

*to transmit the data frame at least toward the virtual network corresponding to the value of the virtual network identifier field.*

*18. The system of claim 17, wherein the second network device is configured to transmit the data frame at least toward the virtual network corresponding to the value of the virtual network identifier field by forwarding at least part of the received data frame on a port selected based at least in part on the value of the virtual network identifier field.*

*19. The system of claim 18, wherein, when the port selected based at least in part on the value of the virtual network identifier field is connected to a dedicated communications medium, the second network device is configured to forward at least part of the received data frame by:*

*removing the type field and the virtual network identifier field from the data frame; and*

*forwarding the data frame without the type field and without the virtual network identifier field on the selected port of the second network device.*

*20. The system of claim 19, wherein the second network device is configured to forward the data frame without the type field and without the virtual network identifier field by:*

*calculating a frame check sequence for the data frame with the type field and the virtual network identifier field removed; and*

*forwarding the data frame with the calculated frame check sequence.*

*21. A system for transmitting a data frame associated with a virtual network between a communications medium and a shared communications medium, the system comprising:*

*a first network device coupled to the shared communications medium and configured;*

*to receive the data frame from the communications medium, the data frame comprising a destination media access control (MAC) address, a source MAC address and a data field;*

*to insert a type field at a location within the data frame between the MAC addresses and the data field, a value of the type field indicating that the data frame comprises a virtual network identifier field;*

*to insert the virtual network identifier field at a location between the type field and the data field;*

*to assign a value to the virtual network identifier field, the value corresponding to the virtual network and*

*to transmit the data frame over the shared communications medium; and*

*a second network device comprising a port coupled to the shared communications medium and configured:*

*to receive the data frame, by:*

*receiving the destination and source MAC addresses;*

*receiving the type field having the value indicating that the data frame comprises the virtual network identifier field; and*

*receiving the virtual network identifier field having the value associated with the virtual network including reading the virtual network identifier field in accordance with the value of the type field to determine the value associated with the virtual network; and*

*to transmit the data frame at least toward the virtual network corresponding to the value of the virtual network identifier field.*

*22. The system of claim 21, wherein the second network device is configured to transmit the data frame at least toward the virtual network corresponding to the value of the virtual network identifier field by forwarding at least part of the received data frame on a port selected based at least in part on the value of the virtual network identifier field.*

*23. The system of claim 22, wherein, when the port selected based at least in part on the value of the virtual network identifier field is connected to a dedicated communications medium, the second network device is configured to forward at least part of the received data frame by:*

*removing the type field and the virtual network identifier field from the data frame; and*

*forwarding the data frame without the type field and without the virtual network identifier field on the selected port of the second network device.*

*24. The system of claim 23, wherein the second network device is configured to forward the data frame without the type field and without the virtual network identifier field by:*

*calculating a frame check sequence for the data frame with the type field and the virtual network identifier field removed; and*

*forwarding the data frame with the calculated frame check sequence.*

*25. A system for transmitting a data frame associated with a virtual network between a communications medium and a shared communications medium, the system comprising:*

*a first network device coupled to the shared communications medium and configured:*

*to receive the data frame from the communications medium, the data frame comprising a destination media access control (MAC) address, a source MAC address, an original type or length field and a data field;*

*to insert a type field at a location within the data frame between the MAC addresses and the original type or length field, a value of the type field indicating that the data frame is associated with a virtual network and that the data frame comprises a virtual network header including a virtual network identifier field and at least one other field, the virtual network identifier field having a value corresponding to the virtual network;*

*to insert the virtual network header at a location between the type field and the data field;*

*to assign a value to the virtual network identifier field, the value corresponding to the virtual network; and*

*to transmit the data frame over the shared communications medium; and*

*a second network device coupled to the shared communications medium and configured:*

*to receive the data frame, the data frame comprising the type field, and the virtual network header;*

*to read the type field to determine if the data frame is associated with a virtual network;*

*in response to determining that the data frame is associated with a virtual network, to read the value of the virtual network identifier field to determine the virtual network with which the data frame is associated; and*

*to transmit the data frame at least toward the virtual network corresponding to the value of the virtual network identifier field.*

*26. The system of claim 25, wherein the second network device is configured to transmit the data frame at least toward the virtual network corresponding to the value of the virtual network identifier field by forwarding at least part of the received data frame on a port selected based at least in part on the value of the virtual network identifier field.*

*27. The system of claim 26, wherein, when the port selected based at least in part on the value of the virtual network identifier field is connected to a dedicated communications medium, the second network device is configured to forward at least part of the received data frame by:*

*removing the type field and the virtual network header from the data frame; and*

*forwarding the data frame without the type field and without the virtual network header on the selected port of the second network device.*

*28. The system of claim 27, wherein the second network device is configured to forward the data frame without the type field and without the virtual network header by:*

*calculating a frame check sequence for the data frame with the type field and the virtual network header removed; and*

*forwarding the data frame with the calculated frame check sequence.*

* * * * *